(12) United States Patent
Merrick (10) Patent No.: US 12,123,200 B2
(45) Date of Patent: Oct. 22, 2024

(54) FIRE-RESISTANT MANUFACTURED-WOOD BASED SIDING

(71) Applicant: LOUISIANA-PACIFIC CORPORATION, Nashville, TN (US)

(72) Inventor: Gareth Paul Merrick, Gig Harbor, WA (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 16/803,749

(22) Filed: Feb. 27, 2020

(65) Prior Publication Data

US 2020/0270871 A1    Aug. 27, 2020

Related U.S. Application Data

(60) Provisional application No. 62/810,983, filed on Feb. 27, 2019.

(51) Int. Cl.
*E04F 13/10* (2006.01)
*B32B 7/12* (2006.01)
(Continued)

(52) U.S. Cl.
CPC ............. *E04F 13/10* (2013.01); *B32B 7/12* (2013.01); *G06F 3/0414* (2013.01);
(Continued)

(58) Field of Classification Search
CPC ......... E04B 2/7411; E04B 1/948; B27N 9/00; B32B 2307/3065; B32B 7/12; E04F 13/10; E04F 2290/045
See application file for complete search history.

(56) References Cited

U.S. PATENT DOCUMENTS 3,566,541 A    3/1971  Coulter
3,616,120 A *  10/1971 Warwick ................ E04C 2/16
                                          428/326

(Continued)

OTHER PUBLICATIONS

International Search Report and Written Opinion, PCT/IB20/00220, Louisiana-Pacific Corporation (international filing date Feb. 27, 2020).

*Primary Examiner* — Brian E Glessner
*Assistant Examiner* — Daniel J Kenny
(74) *Attorney, Agent, or Firm* — Wayne Edward Ramage; Baker Donelson (57) ABSTRACT

A manufactured wood based siding or cladding product made from an engineered wood composite including, but not limited to, oriented strand board (OSB), hardboard, plywood, and combinations thereof, with fire-resistant properties (e.g., resistance to flame spread, ignition and combustion) imparted during the manufacturing process. An engineered wood-based composite siding product (in various forms, including lap, panel or trim) possessing such material properties is better suited for meeting the requirements of certain communities or areas where building codes require such protection due to the risk of fires (such as those posed within the boundaries of the wildland-urban interface, WUI).
Engineered or manufactured wood-based composite products are typically manufactured by assembling multiple layers, then consolidating these layers using heat and pressure. A "fines" layer comprising wood or lignocellulosic wood particles is currently applied to the face of engineered wood-based composite siding products (e.g., lap siding, panel siding, trim) to provide an appropriate outer appearance, or other features, to the product.
In various exemplary embodiments, the present invention treats the particles that make up the "fines" layer before (Continued)

incorporation of the particles into the manufacturing process (i.e., "in-process"). The treatment comprises adding ingredients or additives (using appropriate methods) that impart desired protection when exposed to a fire event. Ingredients, for example, include various borate-based chemistries, minerals, or combinations thereof that impart the desired protection.

18 Claims, 7 Drawing Sheets (51) Int. Cl.
  *G06F 3/041*  (2006.01)
  *G06F 3/0482*  (2013.01)
  *G06F 3/04847*  (2022.01)
  *G06F 3/0488*  (2022.01)
  *G06F 3/16*  (2006.01)
  *H04M 1/72442*  (2021.01)
  *H04M 1/72412*  (2021.01)

(52) U.S. Cl.
  CPC ........ *G06F 3/0482* (2013.01); *G06F 3/04847* (2013.01); *G06F 3/0488* (2013.01); *G06F 3/165* (2013.01); *H04M 1/72442* (2021.01); *B32B 2307/3065* (2013.01); *E04F 2290/045* (2013.01); *G06F 2203/04104* (2013.01); *H04M 1/72412* (2021.01)

(56) References Cited

U.S. PATENT DOCUMENTS

| | | | |
|---|---|---|---|
| 3,873,662 A * | 3/1975 | Cartlidge | C08K 3/38 264/113 |
| 3,874,990 A | 4/1975 | Surdyk | |
| 3,996,325 A | 12/1976 | Megraw | |
| 4,039,645 A | 8/1977 | Coyle et al. | |
| 4,126,473 A | 11/1978 | Sobolev et al. | |
| 4,146,662 A | 3/1979 | Eggers et al. | |
| 4,364,984 A | 12/1982 | Wentworth | |
| 4,914,880 A * | 4/1990 | Albertini | E04B 2/7411 52/243 |
| 4,955,169 A * | 9/1990 | Shisko | E04F 13/0864 52/536 |
| 5,203,941 A | 4/1993 | Spain et al. | |
| 5,397,406 A | 3/1995 | Vaders et al. | |
| 5,470,631 A | 11/1995 | Lindquist et al. | |
| 5,723,020 A * | 3/1998 | Robinson | D21H 21/34 162/181.2 |
| 6,443,257 B1 * | 9/2002 | Wiker | B32B 7/12 181/290 |
| 6,620,349 B1 | 9/2003 | Lopez | |
| 7,222,465 B2 * | 5/2007 | Watson | B29C 48/12 52/590.3 |
| 8,087,205 B2 * | 1/2012 | Pilz | E04B 1/948 52/232 |
| 8,201,372 B2 | 6/2012 | Holt et al. | |
| 8,499,517 B2 | 8/2013 | Wilson et al. | |
| 8,642,184 B2 * | 2/2014 | Wiehn | C09K 21/00 428/536 |
| 9,683,364 B2 * | 6/2017 | Pilz | E04B 1/948 |
| 10,533,097 B2 * | 1/2020 | Lai | C09D 7/63 |
| 2003/0056458 A1 | 3/2003 | Black et al. | |
| 2003/0068441 A1 | 4/2003 | Archer et al. | |
| 2007/0044911 A1 | 3/2007 | Horton | |
| 2008/0035899 A1 | 2/2008 | Udeinya | |
| 2009/0133847 A1 | 5/2009 | Slimak et al. | |
| 2009/0155612 A1 | 6/2009 | Pervan et al. | |
| 2010/0151229 A1 * | 6/2010 | Clark | E04C 2/16 428/326 |
| 2011/0008399 A1 | 1/2011 | Bugnon et al. | |
| 2011/0047913 A1 * | 3/2011 | Kim | E04C 2/26 52/309.13 |
| 2012/0251817 A1 * | 10/2012 | Wiehn | B27N 9/00 428/326 |
| 2013/0000239 A1 | 1/2013 | Winterowd et al. | |
| 2014/0102615 A1 * | 4/2014 | Griem | C09K 21/04 156/62.2 |
| 2015/0020476 A1 | 1/2015 | Winterowd et al. | |
| 2017/0081844 A1 | 3/2017 | Dimakis et al. | |
| 2017/0239500 A1 * | 8/2017 | Koehler | E04B 1/947 |
| 2018/0195282 A1 * | 7/2018 | Pilz | E04B 2/7411 |
| 2018/0248508 A1 * | 8/2018 | Keller | H02S 40/34 |
| 2018/0298609 A1 * | 10/2018 | Banerjee | B32B 3/06 |
| 2020/0270871 A1 | 8/2020 | Merrick | |
| 2020/0392412 A1 * | 12/2020 | Jin | C09K 21/10 |

* cited by examiner

FIRE-RESISTANT MANUFACTURED-WOOD BASED SIDING

This application claim benefit of and priority to U.S. Provisional Application No. 62/810,983, filed Feb. 27, 2019, which is incorporated herein in its entirety by specific reference for all purposes.

FIELD OF INVENTION

This invention relates to manufactured wood based siding made from an engineered wood composite substrate such as oriented strand board (OSB), hardboard, plywood or combinations thereof) with fire-resistant properties imparted in-line, during the manufacturing process and with optional application of synergistic protection in a secondary process.

SUMMARY OF INVENTION

In various exemplary embodiments, the present invention comprises a manufactured wood based siding or cladding product made from an engineered wood composite including, but not limited to, oriented strand board (OSB), hardboard, plywood, and combinations thereof, with fire-resistant properties (e.g., resistance to flame spread, ignition and combustion) imparted during the manufacturing process. An engineered wood-based composite siding product (in various forms, including lap, panel or trim) possessing such material properties is better suited for meeting the requirements of certain communities or areas where building codes require such protection due to the risk of fires (such as those posed within the boundaries of the wildland-urban interface, WUI).

Engineered or manufactured wood-based composite products are typically manufactured by assembling multiple layers, then consolidating these layers using heat and pressure. A "fines" layer comprising wood or lignocellulosic wood particles is currently applied to the face of engineered wood-based composite siding products (e.g., lap siding, panel siding, trim) to provide an appropriate outer appearance, or other features, to the product.

In various exemplary embodiments, the present invention treats the particles that make up the "fines" layer before incorporation of the particles into the manufacturing process (i.e., "in-process"). The treatment comprises adding ingredients or additives (using appropriate methods) that impart desired protection when exposed to a fire event. Ingredients, for example, include various borate-based chemistries, minerals, or combinations thereof that impart the desired protection.

In additional embodiments, one or both ends or sides of the product, as well as the bottom or back surface, may be protected with a coating or paint or laminate, typically applied post-manufacture. In some embodiments, the coating or paint or laminate may be a fire-resistant coating or paint or laminate, typically applied post-manufacture (i.e., as part of the finishing process), thereby increasing overall fire resistance of the finished product (siding) and assembly (e.g., the finished wall). This application may be continuous (i.e., cover an entire surface or side) or be simply applied to an appropriate but select (targeted) area of the siding. Additionally, this coating, paint or laminate may be applied on any surface of the siding or be deposited into grooves (channels) machined into the siding surface. The use of such grooves or channels can be advantageous to packaging, handling and installation. For example, embedment of the protective finish into one or more of a siding surfaces enables the finish to be protected from damage during installation and in-service weather exposure.

The present invention possesses several advantages over the prior art. Treatment of the "fines" layer in a controlled setting (e.g., manufacturing facility) allows the FR treatment to be more thoroughly and consistently applied throughout the face layer of the product (for example, impregnated using pressure), thereby providing integrated and greater protection and fire resistance than a post-manufacturing process application. The fines layer may be FR treated as a pre-assembled (bonded) mat of particles or fibers or as discrete particles.

Additional FR treatments and mechanical features can be applied and/or attached in synergistic combinations to further enhance the fire resistance of the finished product. Examples include, but are not limited to, fire resistant caulks, gels, sealants, coatings or the like, in various forms (extruding or inset/recessed strip, alone or in various dual combinations) and an innovative spline attachment on the lower back side of the finished product that restrains the movement of the siding during a fire event (and thus prevents exposure of the secondary layers of a wall assembly (sheathing, studs, and the like).

DETAILED DESCRIPTION OF EXEMPLARY EMBODIMENTS

Figure 1:
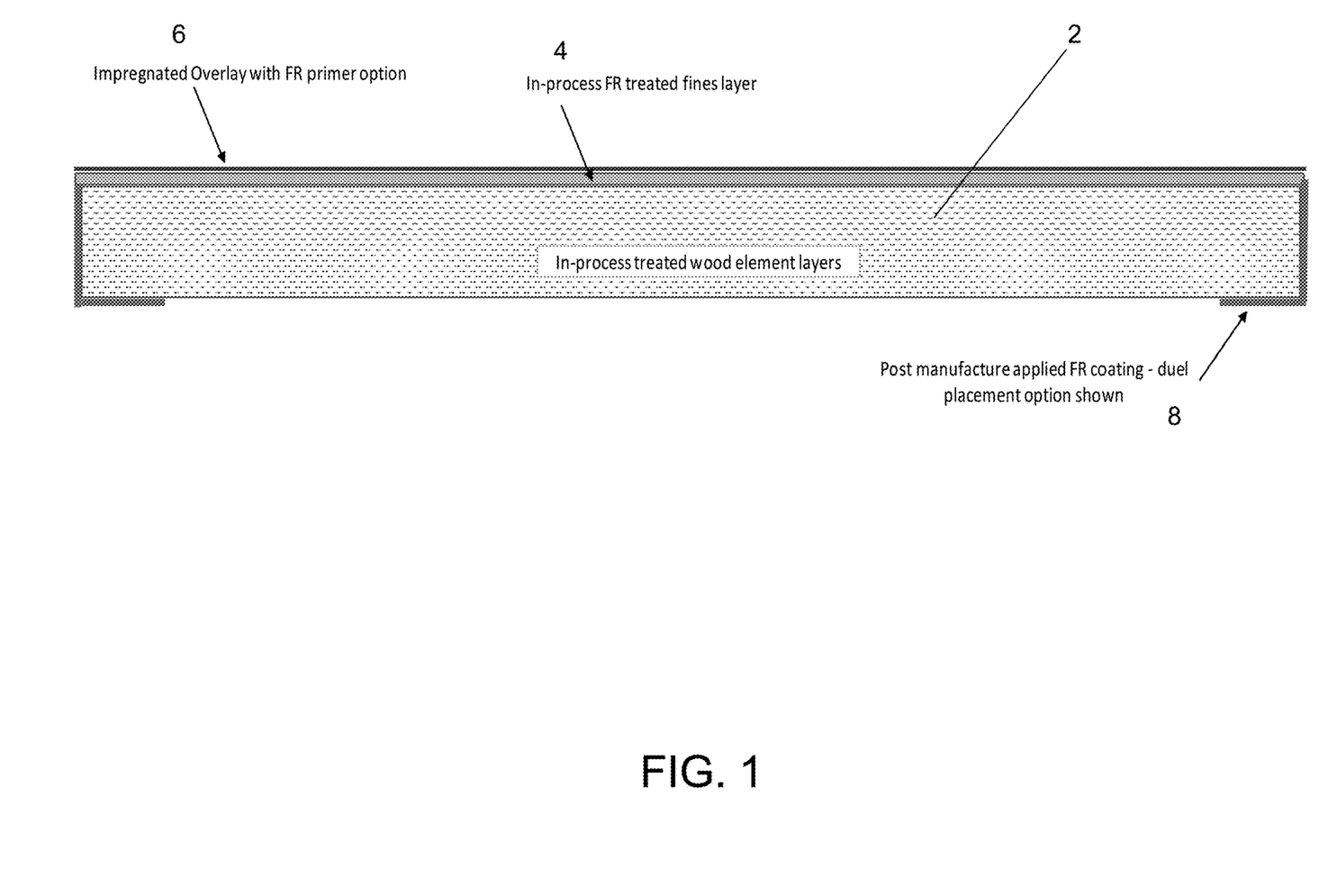
FIG. 1 shows a cross-section view of a siding product in accordance with an embodiment of the present invention.

In various exemplary embodiments, the present invention comprises a manufactured wood based siding or cladding product 10 made from an engineered wood composite including, but not limited to, oriented strand board (OSB), hardboard, plywood, and combinations thereof, with fire-resistant (FR) properties (e.g., resistance to flame spread, ignition and combustion) imparted during the manufacturing process. An engineered wood-based composite siding product (in various forms, including lap, panel or trim) possessing such material properties is better suited for meeting the requirements of certain communities or areas where building codes require such protection due to the risk of fires (such as those posed within the boundaries of the wildland-urban interface, WUI).

Engineered or manufactured wood-based composite products are typically manufactured by assembling multiple layers, then consolidating these layers using heat and pressure. A "fines" layer comprising wood or lignocellulosic wood particles is currently applied to the face of engineered wood-based composite siding products (e.g., lap siding, panel siding, trim) to provide an appropriate outer appearance, or other features, to the product.

In various exemplary embodiments, the present invention treats the particles that make up the "fines" layer 4 before incorporation of the particles into the manufacturing process (i.e., "in-process"). The factory-applied treatment comprises adding ingredients or additives (using appropriate methods) that impart desired FR protection when exposed to a fire event. Ingredients, for example, include various borate-based chemistries, minerals, or combinations thereof that impart the desired protection.

Specific examples of FR treatments include alumina trioxide, boric acid and sodium borate and combinations thereof. These ingredients may be diluted in water to achieve a desired concentration then combined with the wood fines in a suitable vessel. Fines would absorb the treatment solution to achieve the required treatment level matched to the performance requirement of the end product. Equipment capabilities and production requirements would dictate the duration and magnitude of exposure to the treating solution, and the use of pressure or vacuum. After treatment, fines may need to be dried to a suitable moisture content. The target moisture may vary on process and adhesives used. In a process using pMDI adhesive resin to consolidate the fines, a moisture range of 5-10% could be targeted. A combination of vacuum and oven drying (100-150 C) could be used to achieve this final moisture content level.

The "fines" face layer may be composed of wood particles ranging in size from wood flour to wood strands to wood veneers. There may be one or more "fines" layers of the same or different compositions.

In some exemplary embodiments, the fines (wood flour) layer basis weight can range from about 30 to about 500 pounds per thousand square feet. In some embodiments the basis weight can range from about 100 to about 200 pounds per thousand square feet. In additional embodiments, the basis weight can range from about 200 pounds to about 300 pounds per thousand square feet. In several embodiments, the fines layer basis weight is at least around 225 pounds per thousand square feet or greater. In additional embodiments, the fines layer basis weight is an average of approximately 230 pounds per thousand square feet or greater.

The fines layer may be pre-assembled into a mat or laminate prior to consolidation (bonding) to the other layers in the engineered wood-based composite during the manufacturing process. In one exemplary embodiment, a paperboard laminate ranging in thickness from between 0.008" and 0.048" can be used as a fines layer. This paperboard laminate would be made in a separate process during which it is treated with chemistries to impart fire or flame protection. Such chemistries could include combinations of alumina trihydrate and boric acid, as described in U.S. Pat. No. 4,130,458 (which is incorporated herein in its entirety by specific reference for all purposes). In another exemplary embodiment, a hardboard (densified fiber product) ranging in thickness from between 1.5 mm and 0.315", preferably 0.125", may be used.

In several exemplary embodiments, a decorative or protective resin-impregnated performance overlay 6 may be used to cover the outer "fines" layer. The overlay also may contain fire protection treatment (such as a fire-resistant primer or coating) and is of particular use for exterior applications. Specific examples of FR treatments for this overlay include, but are not limited to, a phenol-impregnated Kraft paper treated with combinations of alumina trihydrate and sodium borate, such as described in U.S. Pat. No. 5,723,020 (which is incorporated herein in its entirety by specific reference for all purposes). Such an overlay may be further enhanced by the application of a suitable paint polymer (e.g., exterior acrylic latex).

In additional embodiments, one or both ends or sides of the product, as well as the bottom or back surface, may be protected with a coating or paint or laminate 8, typically applied post-manufacture, but prior to the product being send to the field or job site for installation. In some embodiments, the coating or paint or laminate may be a fire-resistant coating or paint or laminate, typically applied post-manufacture (i.e., as part of the finishing process), thereby increasing overall fire resistance of the finished product (siding) and assembly (e.g., the finished wall). This application may be continuous (i.e., cover an entire surface or side) or be simply applied to an appropriate but select (targeted) area of the siding. Additionally, this coating, paint or laminate may be applied on any surface of the siding or be deposited into grooves (channels) machined into the siding surface. The use of such grooves or channels can be advantageous to packaging, handling and installation. For example, embedment of the protective finish into one or more of a siding surfaces enables the finish to be protected from damage during installation and in-service weather exposure.

The present invention possesses several advantages over the prior art. Treatment of the "fines" layer in a controlled setting (e.g., manufacturing facility) allows the FR treatment to be more thoroughly and consistently applied throughout the face layer of the product (for example, impregnated using pressure), thereby providing integrated and greater protection and fire resistance than a post-manufacturing process application. The fines layer may be FR treated as a pre-assembled (bonded) mat of particles or fibers or as discrete particles.

Additional FR treatments and mechanical features can be applied and/or attached in synergistic combinations to further enhance the fire resistance of the finished product. Examples include, but are not limited to, fire resistant caulks, gels, sealants, coatings or the like, in various forms (extruding or inset/recessed strip, alone or in various dual combinations) and an innovative spline attachment or mechanical restraint on the lower back side of the finished product that restrains the movement of the siding during a fire event (and thus prevents exposure of the secondary layers of a wall assembly (sheathing, studs, and the like), as seen in FIGS. 2-8.

FIGS. 2-7 show a mechanical restraint (e.g., spline) 60 extending from the back side of a piece of lap siding. In the embodiment shown, the spline extends downward at an angle with respect to the back (i.e., the spline forms an acute angle with the back in the direction of the lower edge of the siding). The angle may vary depending on the thickness and design of the siding. The spline may be attached directly to the back, or recessed therein, such as by insertion into a longitudinal slot or groove to be held therein by friction fit and/or adhesive, such as, but not limited to, a high temperature resistant adhesive (e.g., isocyanate-based).

Figure 2:
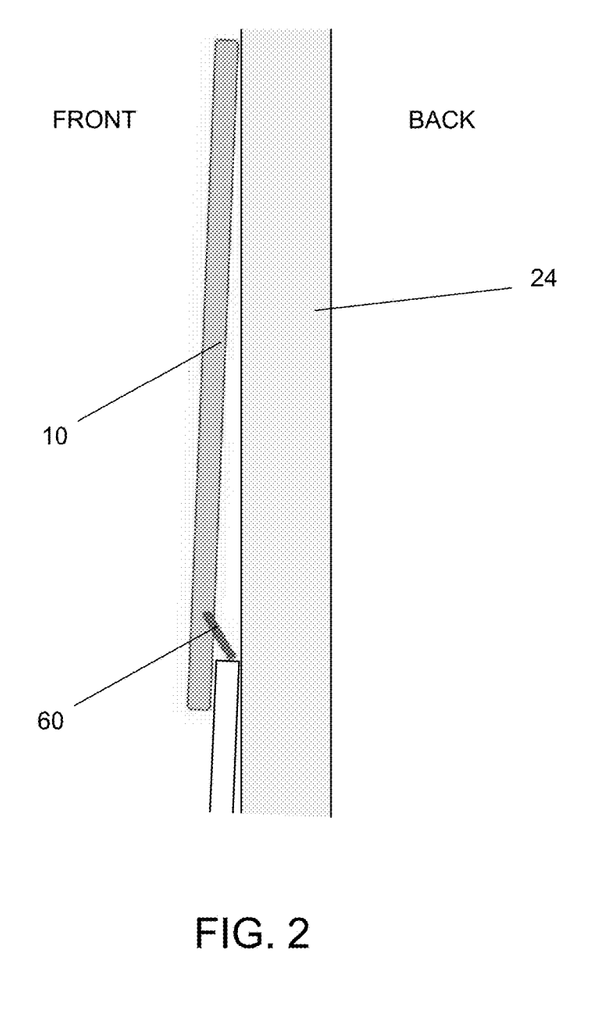
FIG. 2 shows a side view of a piece of siding with a spline in position on the top end of a lower piece of siding on a building frame.
Figure 3A:
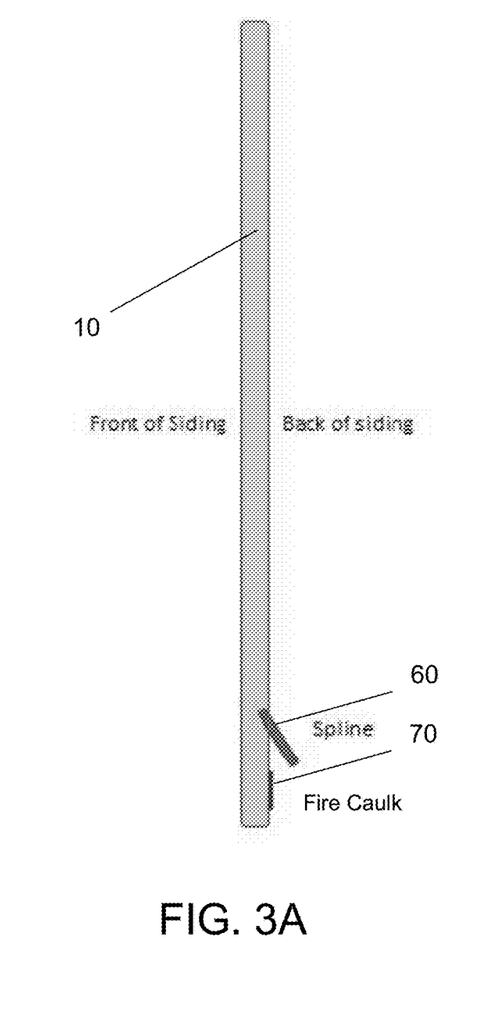
FIG. 3A shows a side view of a piece of siding with a spline with a strip of intumescent FR material ("fire caulk") on the surface of the bottom back face of the siding.
Figure 3B:
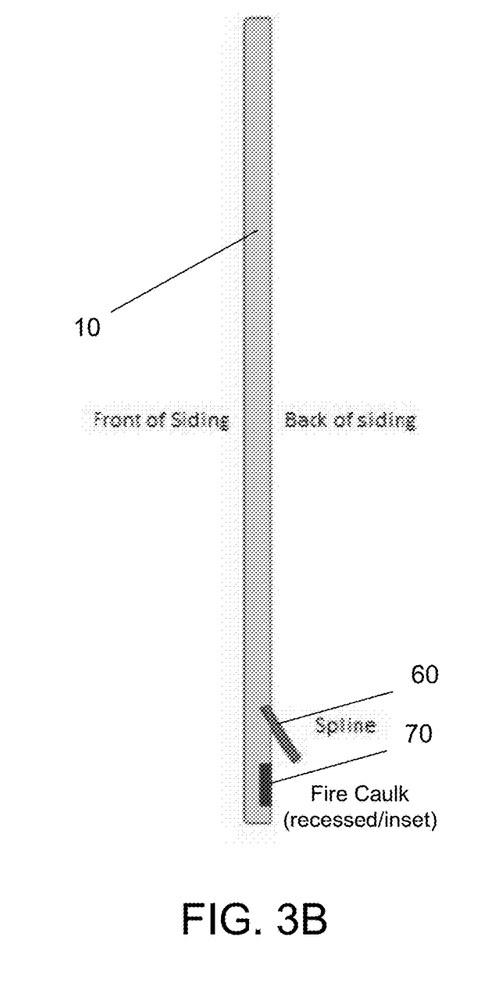
FIG. 3B shows a side view of a piece of siding with a spline with a strip of intumescent FR material embedded in the bottom back face of the siding.
Figure 4A:
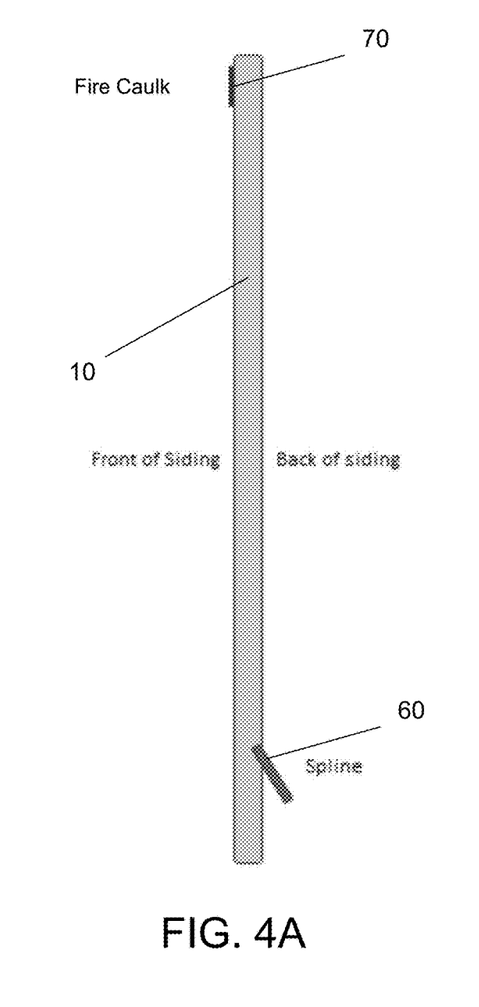
FIG. 4A shows a side view of a piece of siding with a spline with a strip of intumescent FR material on the surface of the top front face of the siding.
Figure 4B:
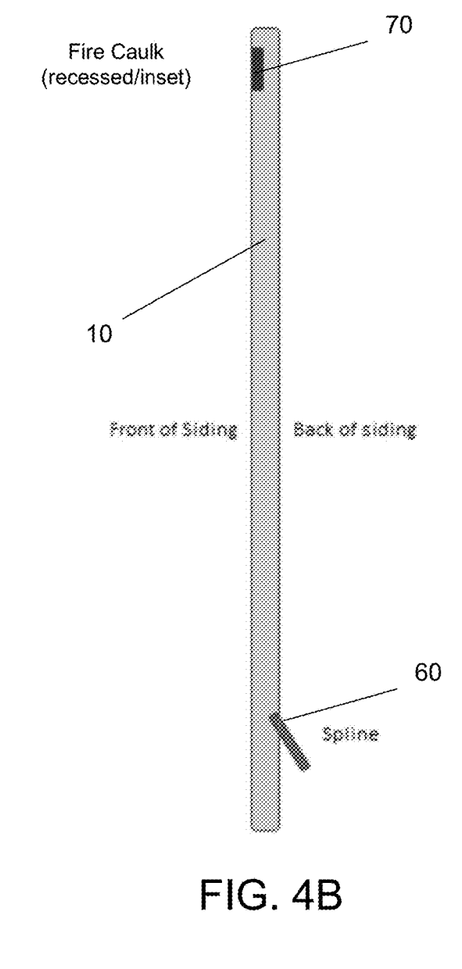
FIG. 4B shows a side view of a piece of siding with a spline with a strip of intumescent FR material embedded in the top front face of the siding.
Figure 5A:
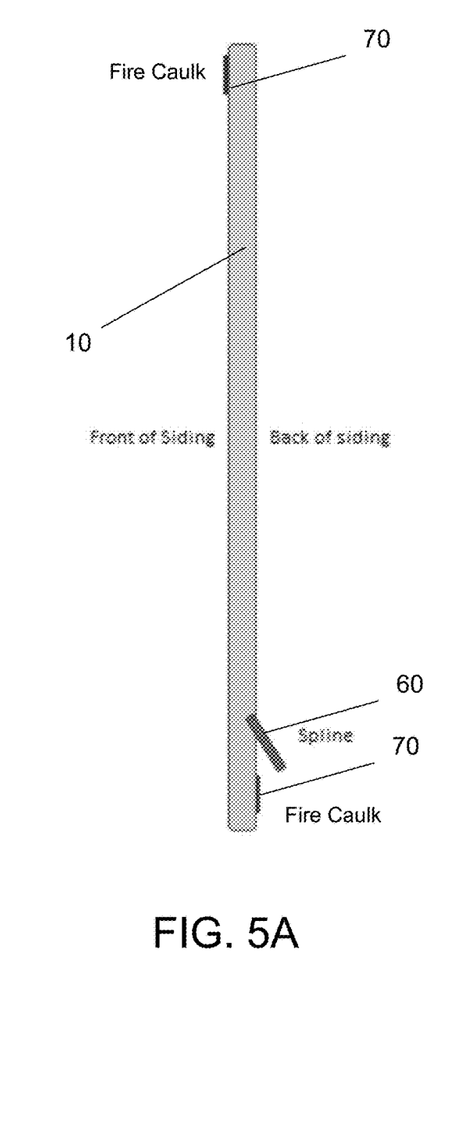
FIG. 5A shows a side view of a piece of siding with a spline with a first strip of intumescent FR material on the surface of the bottom back face of the siding, and a second strip on the surface of the top front face of the siding.
Figure 5B:
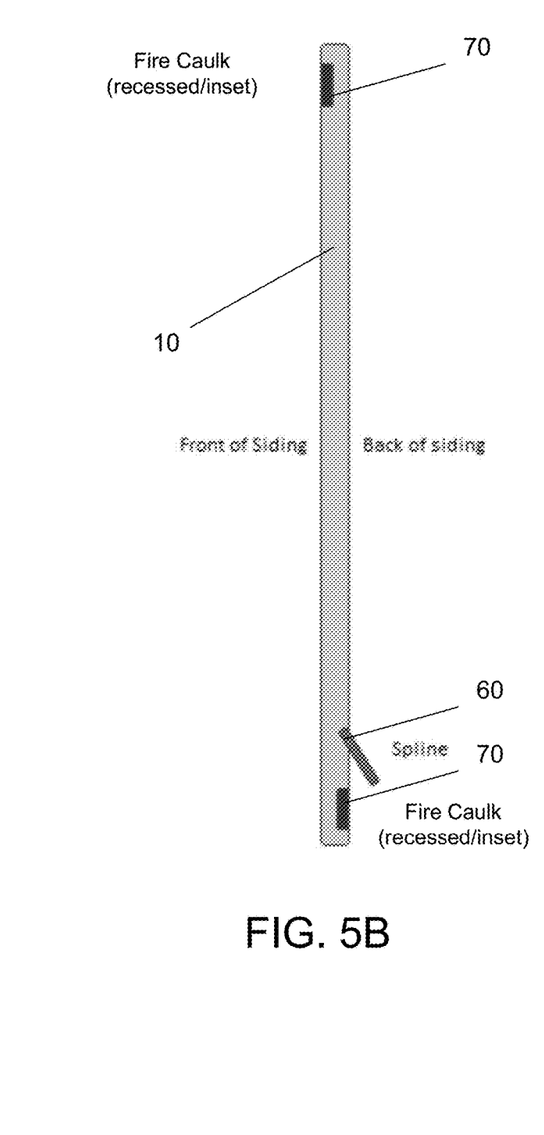
FIG. 5B shows a side view of a piece of siding with a spline with a strip of intumescent FR material embedded in the bottom back face of the siding, and a second strip embedded in the top front face of the siding.
Figure 7:
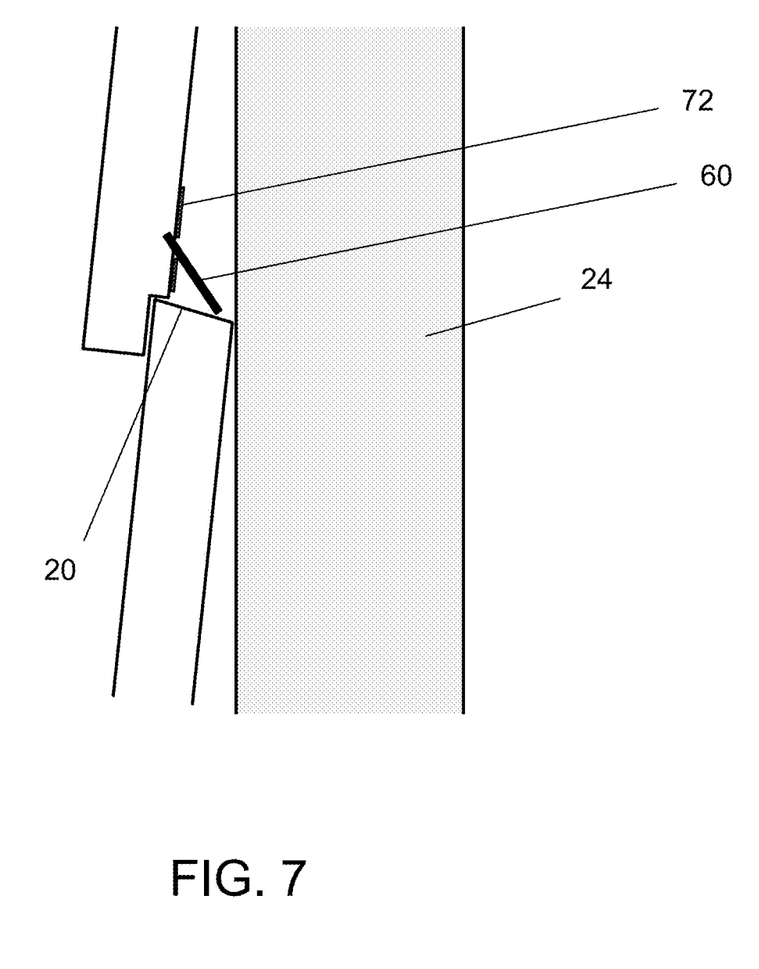
FIG. 7 shows a close-up view of the siding of FIG. 6 installed on a building frame above a lower piece of siding with an angle-cut top.

In preferred embodiments, the spline extends the length of the piece of siding (or at least substantial part of the length of the siding). In some embodiments, a series of spline segments may be positioned on the back of the same piece of siding. The spline (or splines) are generally arranged parallel to the bottom edge of the piece of siding. The spline is positioned so the distal end extends downward and comes into contact with the top of the lower piece of lap siding, where it is generally held by friction fit. In some embodiments, the top edge of the lower piece of lap siding has an angle cut 20 downwards towards the back, so that the top will hold the distal end of the spline in place more securely than a pure friction fit. The spline thus provides a self-indexing function for placement of a piece of lap siding with respect to the lower piece(s) of lap siding during installation.

In a fire event, siding or cladding material, which generally is nailed or secured to the wall framing or studs 24 at or near the top edge of the piece of siding, but not at the bottom, tends to warp or deform outward at the bottom, providing fire access to the space behind the siding, as well as the underlying sheathing or structure. The spline prevents this warping or deformation during a fire event, thereby keeping the bottom of the upper piece of siding proximate or adjacent to the top of the lower piece of siding, and slowing or retarding the spread of the fire. Mechanical restraints as shown have been effective in restraining the bottom edge of the siding and preventing flames from accessing the rest of the wall assembly (e.g., sheathing).

Splines may be made of any suitable material, including, but not limited to, wood, engineered wood, metal, high impact polystyrene, similar materials, or combinations thereof. Additional protection may be afforded by applying a coating of an intumescent paint, such as FF-88 by Fire Free Coatings, Inc., San Rafael, California, to the spline, or the immediate area of the spline.

Figure 6:
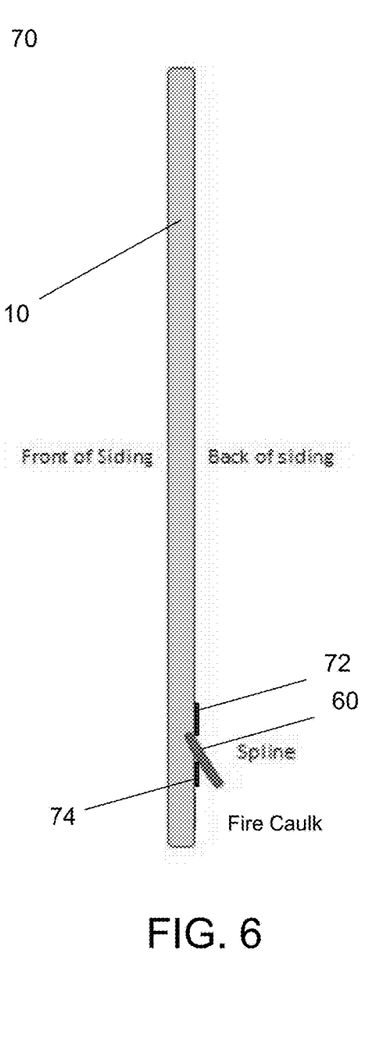
FIG. 6 shows a side view of a piece of siding with a spline with a first strip of intumescent FR material on the back face above the spline, and a second strip below the spline.

FIGS. 3-7 show a strip 70 of intumescent FR sealant, caulk or material extending the length of the siding product, essentially parallel to the top and/or bottom edges (and a spline, if present). Such a strip or strips may be used separate from, or in combination with, the spline or mechanical restraint described above. The intumescent FR strip may be placed in a line or strip on the surface on the front, back, or both, of a piece of siding, proximate the top edge, bottom edge, or both. In an alternative embodiment, the strip may be embedded or set in a recess, groove, or slot extending the length of the siding. Multiple strips may also be placed adjacent to each other, and/or to a spline. FIG. 6, for example, shows an embodiment where two strips are placed on the back surface, one strip proximate to and above 72 the spline 60, and a second strip proximate to and below 74 the spline. FIG. 6 shows the spline and strip positioned above an overlap cut or section along the back bottom edge of the panel, for panels with such an overlap cut, although a thin strip of intumescent FR material may be placed on the back overlap face as well. Combinations of the above configurations and placements may be used on the same piece of siding.

During a fire event, the intumescent FR strip material expands upon the application of heat and/or flame, thereby filling the gaps, including any air gaps, behind the piece of siding, thereby preventing flame for easily coming into contact with the back of the siding and the underlying structure, as described above. Suitable intumescent material for the FR strip, include but are not limited to products such as 3M brand FireBarrier Sealant CP25WB+ or IC15WB+ or STI brand Triple S Firestop Sealer.

The thickness and width of the applied strip material may be matched to the desired performance and properties of the system. In one exemplary embodiment, an embedded strip has a thickness (depth) of approximately 0.15" and width of approximately 0.1875". In other embodiments, a non-embedded intumescent coating or strip (which may be resin-infused or resin-impregnated) measures approximately 0.009" thick by approximately 1" to approximately 8" in width. The exact location, thickness and width of such a coating or strip would need to be matched to the desired end use performance requirement.

In several embodiments, the spline and/or intumescent FR strips and/or coating described above are installed at the factory during the manufacturing process. This saves labor time and expense in the field, and allows the spline and/or strips/coatings to be precisely, consistently, and evenly applied.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A product, comprising:
a multi-layered piece of siding with a substrate layer of engineered-wood and a fines layer, said substrate layer with a front face, back face, top edge, bottom edge, right edge, and left edge;
said fines layer positioned on the front face, said fines layer comprising lignocellulosic wood particles integrated with one or more fire-resistant additives absorbed by said lignocellulosic wood particles;
at least one embedded or inset strip of intumescent fire resistant material, inset or embedded in the front face or the back face, proximate the top edge or bottom edge, and extending the length of the piece of siding parallel to the top edge or bottom edge; and
a spline extending downward at an acute angle from the back face, proximate the bottom edge, and extending for at least a portion of the length of the piece of siding parallel to the bottom edge.

2. The product of claim 1, wherein the one or more fire resistant additives comprise alumina trioxide, boric acid, sodium borate, or combinations thereof.

3. The product of claim 2, further comprising pMDI adhesive resin.

4. The product of claim 1, wherein the fines layer is pre-assembled into a mat or laminate prior to bonding to the substrate layer.

5. The product of claim 1, further comprising a resin-impregnated overlay factory-applied to the fines layer, wherein the overlay comprises a fire-resistant primer or coating.

6. The product of claim 1, further comprising a fire-resistant coating covering one or both ends of the piece of siding.

7. The product of claim 1, wherein the spline extends the length of the piece of siding, and is configured to hold the bottom of the piece of siding proximate to the top of an adjacent piece of siding when installed on a building structure or frame.

8. The product of claim 7, further wherein said at least one strip of intumescent fire resistant material comprises a first strip embedded in the back face between the spline and the bottom edge, said first strip extending the length of the piece of siding parallel to the bottom edge.

9. The product of claim 8, wherein said intumescent fire resistant material expands when exposed to heat or flame.

10. The product of claim 8, further comprising a second strip of intumescent fire resistant material embedded in the back face between the spline and the top edge, proximate to the spline.

11. The product of claim 1, said at least one strip of intumescent fire resistant material comprises a first embedded or inset strip of intumescent fire resistant material, and a second embedded or inset strip of intumescent fire resistant material.

12. The product of claim 1, wherein the lignocellulosic wood particles are pre-treated with said one or more fire-resistant additives, and further wherein said one or more fire resistant additives provide one or more of resistance to flame spread, resistance to ignition, and resistance to combustion.

13. The product of claim 1, wherein the engineered-wood substrate is one or more of oriented strand board (OSB), plywood, or hardboard.

14. The product of claim 1, wherein the piece of siding is one or more of a piece of lap siding, panel siding, or trim.

15. The product of claim 1, wherein the fines layer constitutes the face layer of the product, and said one or more fire-resistant additives are thoroughly and consistently applied throughout the face layer, and thus are configured to provide enhanced integrated fire protection and resistance.

16. The product of claim 1, wherein the fines layer comprises wood-based fines with a basis weight ranging from about 200 pounds per thousand square feet to about 300 pounds per thousand square feet.

17. The product of claim 1, wherein the fines layer is a pre-assembled mat or laminate.

18. The product of claim 1, wherein the fines layer comprises a paperboard laminate with a thickness between 0.008" and 0.048".

* * * * *